United States Patent
Liebenow

(10) Patent No.: US 8,751,175 B2
(45) Date of Patent: Jun. 10, 2014

(54) METHOD AND DEVICE FOR OVERLOAD DETECTION IN BATTERY-OPERATED DEVICES HAVING AN ELECTRIC MOTOR

(75) Inventor: Cornelius Liebenow, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 368 days.

(21) Appl. No.: 13/146,581

(22) PCT Filed: Dec. 4, 2009

(86) PCT No.: PCT/EP2009/066390
§ 371 (c)(1),
(2), (4) Date: Oct. 7, 2011

(87) PCT Pub. No.: WO2010/086054
PCT Pub. Date: Aug. 5, 2010

(65) Prior Publication Data
US 2012/0022808 A1  Jan. 26, 2012

(30) Foreign Application Priority Data
Jan. 28, 2009 (DE) .......................... 10 2009 000 459

(51) Int. Cl.
*G01R 31/00* (2006.01)

(52) U.S. Cl.
USPC ........................................................ 702/58

(58) Field of Classification Search
USPC ............................................................ 702/58
See application file for complete search history.

(56) References Cited

U.S. PATENT DOCUMENTS

| | | | |
|---|---|---|---|
| 5,343,137 A | 8/1994 | Kitaoka | |
| 2003/0011245 A1* | 1/2003 | Fiebig | ............................. 307/48 |

FOREIGN PATENT DOCUMENTS

| | | |
|---|---|---|
| DE | 102005038225 | 4/2008 |
| EP | 1825964 | 8/2007 |

* cited by examiner

*Primary Examiner* — Stephen Cherry
(74) *Attorney, Agent, or Firm* — Kenyon & Kenyon LLP

(57) ABSTRACT

In a method for detecting an overload situation in a battery-operated device having an electric motor, a load current of the electric motor is ascertained and used to deduce a thermal overload of the battery in such a manner, that, starting out from a static temperature limit, a temporally variable, maximum permissible temperature limit for the battery is calculated using a specifiable function dependent on the ascertained load current. The calculated, variable temperature limit is compared to a current, measured temperature of the battery, and a thermal overload of the battery is deduced from the result of the comparison.

14 Claims, 2 Drawing Sheets

METHOD AND DEVICE FOR OVERLOAD DETECTION IN BATTERY-OPERATED DEVICES HAVING AN ELECTRIC MOTOR

FIELD OF THE INVENTION

The present invention relates to a method for detecting an overload situation in a battery-operated device having an electric motor, a load current of the electric motor being ascertained and used in order to deduce a thermal overload of the battery. In addition, the present invention relates to a corresponding apparatus.

BACKGROUND INFORMATION

An overload monitoring is described in DE 10 2005 038 225.

Numerous types of power tools or electric garden tools may be operated without a connection to a power supply system. For storing the energy in these "cordless" power tools, garden tools or electric vehicles, electrochemical cells are used that are either permanently installed in the device or are situated in batteries removable from the device. In the following, the term "batteries" is used for all such cells, in particular, for rechargeable cells, e.g., Li-ion cells of a storage battery, as well.

In order to ensure the reliability and an energy storage capacity of the electrochemical cells that is stable in the long term, the cells should be protected from excessive heating due to extracting the energy stored in the cells too quickly.

This limiting may be implemented most easily by using components, which limit or interrupt the flow of current, either via direct heat transfer or amid too great a current flow and the resulting temperature increase of the component, for example, using conventional thermal fuses or bimetallic switches. A disadvantage of using such simple components, which are situated in the current path between the energy store and the load, is that in general, they may only constitute rough protection. This results from the fact that in order to operate power tools and similar devices, typically, relatively high currents must be drawn, whose order of magnitude is close to the overload or short-circuit currents whose flow is supposed to be prevented by the use of a fuse.

To limit the heating of the battery in operation, it is also conventional that closed-loop control or open-loop control, for instance, in the form of an electronic circuit, may be integrated into the device. In this context, the temperature of the cells is measured by one or more temperature sensors that are situated at or near the cell surface. Thus, for example, an NTC temperature sensor may be fixed to a location of the cell housing, from which one assumes that it accurately reflects the inside temperature of the cell. The temperature limits for the forced limitation of the load current are typically implemented as static quantities, and in the simplest case, as a maximum permissible temperature value. If exceedance of this temperature is detected at the cells by the temperature sensor, then the flow of current is interrupted. In this context, it is also conventional that several temperature limits may be implemented, at the exceedance of which the current may be increasingly limited in correspondingly many stages. A disadvantage of using static temperature limits is that, with regard to protecting the cells from overheating, these temperature limits only achieve the optimum effect for values of the discharging current defined very precisely. Thus, it is possible that the drawing of a very high current has caused the cell to already heat up very sharply in the interior, but that the inertia of the thermal conduction to the outer wall of the cell causes excessive heating of the cell to only be detected later and the necessary limiting of the current to only set in much later. This may mean that a critical situation is detected too late. In order to prevent this situation, the static temperature limits for limiting the maximum permissible discharging current may be set lower, so that intervention already takes place at an earlier stage of the heating of the cells. However, this means that in the event of more moderate discharges in which there is not such a sharp gradient between the interior temperature of the cell and the exterior temperature of the cell, the current is limited or interrupted earlier than actually intended. In order to counteract the impermissibly sharp temperature increase of the cells while drawing very high currents, the implementation of very low temperature limits may be necessary, which means that normal operation at moderate currents is already sharply limited or even becomes completely impossible at a slightly increased ambient temperature.

The above-mentioned publication, DE 10 2005 038 225, describes a method for detecting overload, in which, in order to limit the load current, the (measured) temperature of the cells is not used as a starting point, but in which the limitation of current is ascertained on the basis of the current drawn from the cells. In the above-mentioned, published patent application, it is proposed that thermal overload of components of the power train, e.g., the battery, be deduced from the difference between the value of the load current and at least one stored current value. It is also proposed that, for the subtraction, the simple, instantaneous value of the load current not be used, but a value weighted according to its magnitude, or a current value integrated over a particular time. Furthermore, it is proposed that in the event of a detected overload situation, the current be reduced or interrupted, using closed-loop control. It is mentioned that in the determination of system parameters, the operating temperature may enter into the arithmetic determination of an overload situation in the form of an input variable. A disadvantage of protecting the cells from overheating according to the conventional method, i.e., based only on the measurement of the current, is that possible changes in the system that may lead to an unexpectedly high temperature increase of individual components, for instance, the ageing of or damage to cells and the associated increase in internal resistance, are not taken into consideration. To be sure, the current is always measured, but the actual temperature at the cells is not measured or is only used as an input variable for the calculation. Seemingly disadvantageous is, in addition, the necessity of already having to set specific, maximum allowable currents during the design phase or, at the latest, during final implementation, which, in the event of a subsequent modification of the system, e.g., when using different cells (manufacturer, type), results in limitations, since a thermal characteristic of the utilized components that it always the same is necessary. Accordingly, an unauthorized exchange of the originally installed cells for cells having a different thermal characteristic or internal resistance may lead to safety problems.

SUMMARY

The method according to example embodiments of the present invention provides that a temporally variable, maximum allowable temperature limit for the battery be calculated using a specifiable function dependent on the ascertained load current, where at zero load current, the function assumes its maximum value that corresponds to a specifiable, static temperature limit; and that the calculated, variable temperature limit be compared to a current, measured temperature of the battery and a thermal overload of the battery be deduced from the result of the comparison.

Starting out from a static temperature limit as a maximum of the function, the method includes the calculation of variable, i.e., load-current-dependent, temperature limits and a comparison of the temperature actually measured at the electrochemical cells to the calculated, currently valid temperature limit. The presence or absence of a thermal overload of the battery is deduced from the result of the comparison, so that if occasion arises, an action used as a countermeasure may be initiated.

In comparison with simple design approaches such as the use of a thermal fuse or a bimetallic switch, the advantage of the method hereof is that the load current is not interrupted in response to the exceedance of a particular temperature, but that the previous history of the heating is considered; as the current temperature limit is not simply derived from only the current value of the load current. Consequently, it is possible to differentiate between rapid heating due to high load currents and gradual heating due to moderate load currents. The thermal inertia of the cells, which may, in the first case, cause the simple thermal fuse to respond too late, is considered by the method. This is primarily of use in the event of a discharge of the cells at very high load currents, since in this case, even after interrupting the high load current with the aid of a thermal fuse, a considerable, further increase in the measured cell temperature still occurs ("subsequent heating").

A further advantage of the method is that, consequently, for different uses of a device having an electric motor and the various, typical instances of current drain associated therewith, overly late detection of an impermissibly large temperature increase that has already occurred in the cell interior is prevented, but on the other hand, instances of temporarily high current drain are also rendered possible and not prevented by a temperature limit that is permanently set very low.

An advantage of the method's predictive calculation and use of a maximum permissible temperature of the electrochemical cells on the basis of the currently ascertained load current is that the generation of excessive heat in the cell may already be taken into consideration before the occurrence of high temperatures inside the cell becomes noticeable due to heating of the cell casing.

In contrast to the conventional design approach, in which the measured temperature (to the extent considered) is only an input variable for calculating a maximum permissible current value, the method described herein responds to an actually measured temperature value by comparison to the calculated, variable temperature limit, which means that thermal overload of the battery may be directly deduced. The method for overload detection also functions in the sense of a safety mechanism, when one or more cells are already old, damaged or defective and therefore heat up more rapidly than was originally intended and, e.g., represented with the aid of a system parameter.

According to example embodiments of the present invention, a load current value integrated or averaged over a specifiable time interval is used as an input variable of the load-current-dependent function for calculating the variable temperature limit. It may be provided that prior to the integration or averaging, the load current value be raised to a power, using an exponent. In this manner, in particular, the temporally backward-looking or forward-looking horizon of the load-current dependence may be preset as a function of the types of overload situations to be expected during operation.

The method may allow the instantaneous load current to be reduced or interrupted as a countermeasure to a detected thermal overload. Other actions, such as warning the user by an optical or acoustic signal, or switching on a positive cooling system of the cells in the battery pack, as well as the combination of several actions, are also possible.

Starting out from different static temperature limits and/or different functions, example embodiments of the present invention may allow several variable temperature limits to be calculated; the load current only being interrupted in response to the highest calculated, variable temperature limit being exceeded, while in response to the lower, calculated variable temperature limits being exceeded, the load current being reduced, in each instance, to particular, specifiable values. This may allow a more flexible, graduated response of the monitoring to the overload.

For the calculation of the temperature limits, example embodiments of the present invention may select a function, which considers the thermal behavior, e.g., the thermal inertia of the cell, in view of the measurable temperature increase after the flow of a particular, high load current. It is also possible to dynamically ascertain at least one parameter in the battery-operated electric device that describes the thermal behavior of the battery and enters into the function.

In all of the example embodiments, the load current may be measured, or determined approximately or approximated, using a procedure that is executed in the device and is connected with the operation of the electric motor.

Since the overload detection considers the previous history of the heating, the temperature of the battery does not need to be monitored in the interior in a technically complicated manner, but it is sufficient to measure the temperature at one or more points at or near the electrochemical cells of the battery.

Above and beyond the generic features, a monitoring apparatus according to example embodiments of the present invention has a logic device, in which a specifiable function dependent on the ascertained load current is implemented, in order to calculate a temporally variable temperature limit from a maximum permissible, static temperature limit stored in the logic device and compare the temporally variable temperature limit to the current temperature of the battery measured by a sensor, in order to deduce a thermal overload of the battery therefrom.

In the following, example embodiments of the present invention are described in more detail with reference to the figures.

DETAILED DESCRIPTION

Figure 1:
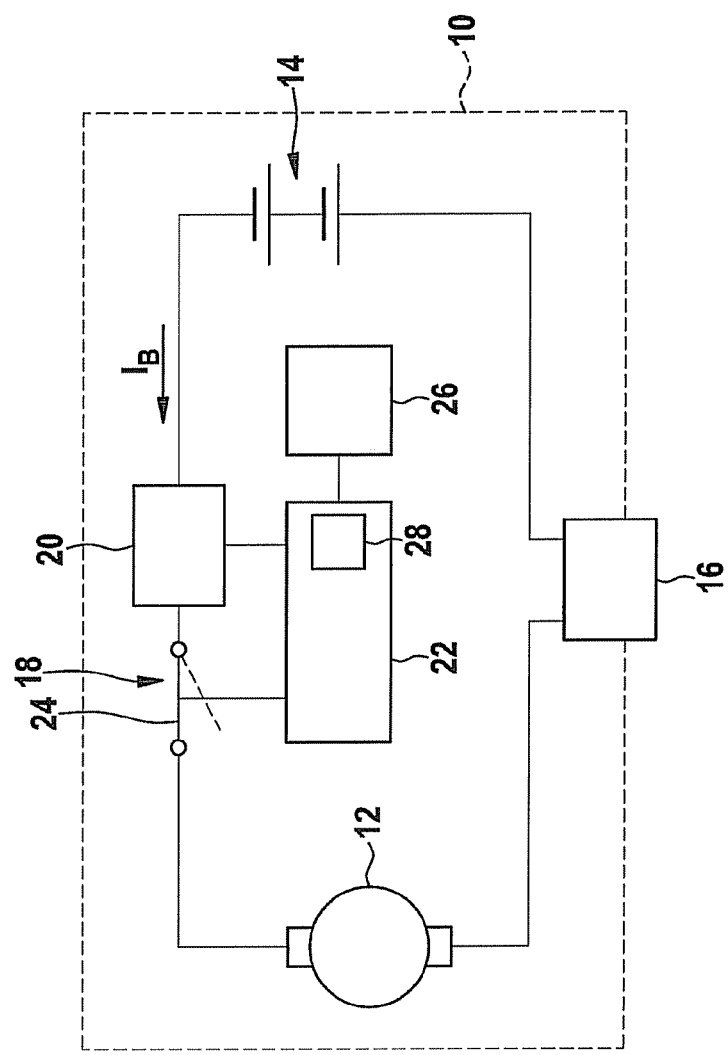
FIG. 1 schematically illustrates an exemplary embodiment of a hand-held power tool having a monitoring apparatus.

FIG. 1 shows a hand-held power tool 10 an electric motor 12, hand-held power tool 10 being powered by a storage battery 14. Starting out from storage battery 14, an operating element 16, electric motor 12, an interruption device 18 and a current-measuring device 20 are situated in the electric circuit. Interruption device 18 is controlled by a monitoring apparatus 22. Interruption device 18 has a switch 24 (an implementation in the form of a semiconductor component is also possible), which is normally closed but may be opened, if necessary, by monitoring apparatus 22. The open position of switch 24 is indicated by a dashed line. Finally, storage battery 14 is assigned a temperature-measuring device 26 that measures the temperature of storage battery 14. At least one static, limiting temperature value is stored in monitoring apparatus 22 or in logic device 28; in this case, the static, limiting temperature value being permanently stored in hardware.

For use of the method according to example embodiments of the present invention, it is necessary to measure load current I and to measure the temperature at or near electrochemical cells 14. The measured current values and temperature data are processed in unit 22, which, if occasion arises, also effects a reduction in or interruption of the load current.

The voltage drop across a shunt resistor or also a different, suitable current-measuring converter 20 may be used for measuring the current. The current may be measured continuously, or else in an appropriate time interval (e.g., in cycles lasting seconds). Temperature ($T_{Cell}$) is measured by one or more suitable temperature sensor(s) 26, which is/are placed on the surface of the electrochemical cells 14 used, or at least near them. This sensor 26 may be, for example, an NTC.

The current and temperature values are ascertained and processed by a unit 23 represented in FIG. 1, for instance, in the form of an electronic circuit having logic device 28 (storage unit, processing unit and software). One (or more) temperature value(s) ($T_{limit}$), at which the load current must be limited to a particular maximum value or the flow of current must be completely interrupted, are calculated from the measured current values. To this end, a function of the type (1) is to be implemented in control unit 22 or in logic device 28, $$T_{limit}(t)=f(I,t) \quad (1),$$

where $T_{limit}(t)$ refers to a calculated, permissible, maximum temperature value $T_{limit}$ at time t.

Control circuit 22 may allow a load current without restrictions as a function of the result of the comparison of temperature limit Tlimit from the calculation, valid at this instant, and the temperature measured at the cells, or may reduce or even interrupt the instantaneous load current, so that the temperature (TCell) measured at the cells is already over a calculated limit temperature or in a particular temperature interval with respect to a limit temperature Tlimit.

The load current may advantageously be integrated or averaged over a particular time interval. In addition, not only the average (discharge) current, but also a value of the same integrated over a particular time and raised to a power, e.g., the second power or even a value raised to a power using a greater exponent, may be used as an input variable for correcting the temperature limits.

In addition, a plurality of temperature values ($T_{limit}$) may be calculated, e.g., a value ($T_{limit-max}$), at which the flow of the load current is completely interrupted, and further temperature values ($T_{limit\ 1,\ 2\ ...}$) that represent threshold values. When temperature ($T_{Cell}$) measured at cells 14 exceeds the threshold values, the load current is already limited to particular values, before it is completely interrupted upon $T_{limit-max}$ being reached.

Due to the calculation of variable temperature limits, a cancellation of the current interruption or the current limitation is achieved either by cooling off cells 14 (actively or passively), or also by loading the cells with less current, or the maintenance of the resting phase forced by a current interruption is achieved. The corresponding response may be obtained by selecting a suitable function (1).

The different temperature limits ($T_{limit-max}, T_{limit\ 1,\ 2\ ...}$) for the occurring limitation of the allowed load current may also be calculated according to different formulas, as is exemplarily described further below.

The ambient temperature, in which the device is operated, and which, e.g., may be measured by a further sensor, may also be considered in the calculation of temperature limit ($T_{limit}$) in the form of an input variable, as is indicated in the following equation (2), $$T_{limit}(t)=f(I,t,T_{ambient}) \quad (2).$$

In addition to the instantaneous current value ascertained from the during the operation of power tool 10 and averaged over a particular time interval, one or more parameters may be included in the calculation of the maximum permissible current, the parameters describing the tendency of the utilized cell(s) 14 to internally generate heat (e.g., the internal resistance of the cells).

If the device may only be connected to and operated by a particular battery type (cell type), then a constant computational value may be used as a parameter for the utilized battery pack/cell type. When it is possible to use different battery packs in a power tool, this parameter may be encoded at the respective battery pack by a suitable device and acquired and evaluated by device 10.

A parameter of battery 14, for instance, a d.c. resistance, may also be dynamically ascertained by the power tool 10 powered by the battery, e.g., by comparing current-voltage values during operation, and then used for calculation of temperature limit ($T_{limit}$), as is explained in even more detail further below.

In addition to the use of measured current values, current values advantageously estimated, e.g., in light of the monitoring of a cooling unit of device 10, may also be used as a starting point for calculating temperature limit ($T_{limit}$).

The method may be used in the case of Li-ion batteries.

Figure 2:
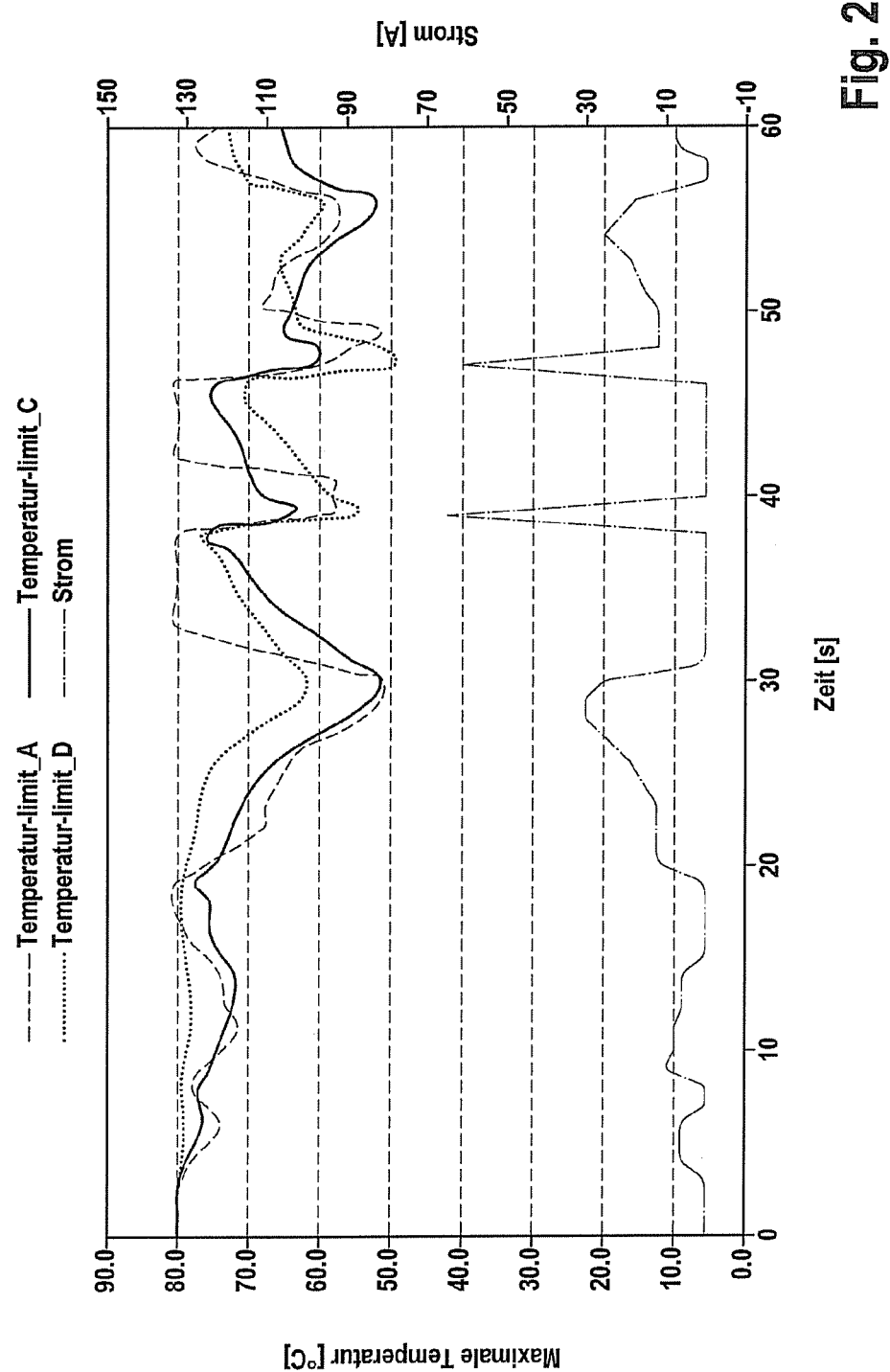
FIG. 2 is a graph which shows, in its lower portion, the time characteristic of the load current and, in its upper portion, the corresponding plot of the variable temperature limit calculated in several variants.

Two functions represented in equations (3) and (4), cf. top of FIG. 2, are mentioned as examples of suitable functions for calculating a maximum temperature, at which the discharge of the cell is still permitted; three different variants of the calculated temperature limits for interrupting the load current as a function of the current drawn in the preceding time interval being shown at the top of FIG. 2:

$$\text{Temp-limit}\_A(t)=T_{max}(I=0)-F1*I_{average}(3s) \quad (3)$$

$$\text{Temp-limit}\_C(t)=T_{max}(I=0)-F2*I_{average}(\text{weighted},\ 8s) \quad (4)$$

In FIG. 2, a maximum temperature $T_{max}$ (I=0) of 80° C. is used as an example value of the specifiable, static temperature limit. F1, F2 and F3 are factors. As soon as a load current flows, i.e., I and, consequently, $I_{average}$ as well, become unequal to zero, then a new temperature limit that is, at any rate, less than 80° C. is generated in accordance with equations (3) and (4). However, in the case of a function according to equation (3), heating of cells 14 up to the maximum possible value of 80° C. is already allowed again 3 s after the flow of a high load current. This behavior is also shown clearly in FIG. 2, where it is apparent that almost immediately after a current peak, the function Temp-limit_A(t) assumes the value $T_{max}$ (I=0) again, namely, the selected 80° C., while the other functions, c.f. equations (3) and (4), represent a more sluggish reaction implemented in the overload monitoring, or a longer memory.

In the case of equation (4), calculating an average value over the preceding 8 s has the result that, after the flow of a higher current for 8 seconds, the temperature for switching off the current is markedly reduced with respect to the maximum temperature (80° C.), which means that if higher currents are drawn again during this time, the system would go into thermal shutdown.

While equation (3) would be suited for a battery, whose cells 14 and whose temperature sensor 26 have a very low thermal inertia, equation (4) may be regarded as an example function for cells and/or temperature sensor(s) having a higher inertia.

It is advantageous to use the square of load current I for the calculation, as is shown in the function according to the following equation (5), cf. the curve Temp-limit_D in FIG. 2. In this action, the more intense, internal heating of the cells at high currents is considered, while medium and low currents scarcely contribute to a lowering of the maximum permissible operating temperature of battery 14 at a particular time.

$$\text{Temp-limit\_}D(t) = T_{max}(I=0) - F3 * I^2_{average}(\text{weighted}, 8s) \quad (5)$$

During the use of different temperature limits for initiating a reduction in the load current and the complete interruption of the load current, formulas of different mathematical structure may also be used for calculating these different temperature limits. Thus, e.g., the previous current loading and its temporal distance from the current time of the calculation may be weighted differently. As a result, temperature limits for reducing the load current do not differ, at each instant, by a constant factor or a constant temperature difference, from the temperature value that calls for the interruption of the current flow.

A variant of the method is possible, in which the internal d.c. resistance of the cells is ascertained from pairs of values of, in each instance, load current measured at a point in time and the simultaneously measured terminal voltages of the battery or the voltage values of individual cells; and in which this internal resistance value is included, as a parameter, in the equation for calculating the maximum permissible temperature of the cells. In this manner, the calculation of the maximum permissible cell temperature may take into account an individual parameter of the cells important for the internal heating of the cells, and take into consideration the ageing or the corrosion of the electrochemical cells.

By combining the described system with a conventional safety mechanism, for instance, combining with a thermal fuse, the safety of a system monitored using the overload detection is markedly increased once more, as the variable temperature limits are primarily relevant for retaining the energy storage capacity of the cell, while a thermal fuse only interrupts the current in response to a temperature increase over and above the allowed degree.

What is claimed is:

1. A method for detecting an overload situation in a battery-operated device having an electric motor, comprising:
   ascertaining, by a device, a load current of the electric motor;
   calculating, by a logic device, a temporally variable, maximum permissible temperature limit for the battery based on a specifiable function dependent on the ascertained load current, the function assuming a maximum value, which corresponds to a specifiable static temperature limit, in response to a zero load current;
   comparing, by the logic device, the calculated, variable temperature limit to a current, measured temperature of the battery; and
   deducing, by the logic device, a thermal overload of the battery in accordance with a result of the comparison.

2. The method according to claim 1, wherein a load current value integrated or averaged over a specifiable time interval is used as an input variable of the load-current-dependent function for calculating the variable temperature limit.

3. The method according to claim 2, wherein prior to the integration or averaging, the load current value is raised to a power, using an exponent.

4. The method according to claim 1, wherein an instantaneous load current is reduced or interrupted as a countermeasure to a detected thermal overload.

5. The method according to claim 4, wherein starting out from at least one of (a) different, static temperature limits and (b) different functions, a plurality of variable temperature limits are calculated; and the load current is only interrupted in response to a highest calculated, variable temperature limit being exceeded, while in response to the lower calculated, variable temperature limits being exceeded, the load current is reduced, in each instance, to particular, specifiable values.

6. The method according to claim 1, wherein an ambient temperature of the battery-operated device is used as an additional input variable of the load-current-dependent function for calculating the variable temperature limit.

7. The method according to claim 1, wherein in order to calculate the variable temperature limit, a function is specified that reflects a thermal behavior of the battery with regard to measurable temperature increase after flow of a particular load current.

8. The method according to claim 7, wherein at least one parameter that describes the thermal behavior of the battery and is included in the function is dynamically ascertained in the battery-operated, electric device.

9. The method according to claim 1, wherein the load current is measured or determined by approximation with the aid of a procedure executed in the battery-operated device, the procedure being connected with operation of the electric motor.

10. The method according to claim 1, wherein a temperature is measured at one or more points at or near electrochemical cells of the battery.

11. The method according to claim 1, wherein the method is performed by a monitoring apparatus for the battery-operated device having the electric motor operable by the battery, for detecting the overload situation, comprising:
   the device adapted to ascertain the load current of the electric motor;
   the logic device adapted to implement the specifiable function dependent on the ascertained load current, in order to calculate the temporally variable temperature limit from the maximum permissible, static temperature limit stored in the logic device and to compare the temporally variable temperature limit to the current temperature of the battery measured by a sensor, in order to deduce the thermal overload of the battery therefrom.

12. A monitoring apparatus for a battery-operated device having an electric motor operable by a storage battery, for detecting an overload situation, comprising:
   a device adapted to ascertain a load current of the electric motor;
   a logic device adapted to implement a specifiable function dependent on the ascertained load current, in order to calculate a temporally variable temperature limit from a maximum permissible, static temperature limit stored in the logic device and to compare the temporally variable temperature limit to a current temperature of the battery measured by a sensor, in order to deduce a thermal overload of the battery therefrom.

13. The monitoring apparatus according to claim 12, wherein the battery-operated device includes a hand-held power tool.

14. The monitoring apparatus according to claim 12, wherein the monitoring apparatus is adapted to perform a method for detecting the overload situation in the battery-operated device having the electric motor, comprising:
- ascertaining, by the device, a load current of the electric motor;
- calculating, by the logic device, the temporally variable, maximum permissible temperature limit for the battery based on the specifiable function dependent on the ascertained load current, the function assuming a maximum value, which corresponds to the specifiable static temperature limit, in response to a zero load current;
- comparing, by the logic device, the calculated, variable temperature limit to the current, measured temperature of the battery; and
- deducing, by the logic device, the thermal overload of the battery in accordance with a result of the comparison.

* * * * *